United States Patent
Whatmough et al.

(10) Patent No.: US 10,579,126 B2
(45) Date of Patent: Mar. 3, 2020

(54) CLOCK FREQUENCY REDUCTION FOR AN ELECTRONIC DEVICE

(71) Applicant: ARM LIMITED, Cambridge (GB)

(72) Inventors: Paul Nicholas Whatmough, Cambridge (GB); David Michael Bull, Cambridge (GB); Shidhartha Das, Upper Cambourne (GB)

(73) Assignee: ARM Limited, Cambridge (GB)

( * ) Notice: Subject to any disclaimer, the term of this patent is extended or adjusted under 35 U.S.C. 154(b) by 118 days.

(21) Appl. No.: 15/308,658

(22) PCT Filed: Mar. 13, 2015

(86) PCT No.: PCT/GB2015/050736
§ 371 (c)(1),
(2) Date: Nov. 3, 2016

(87) PCT Pub. No.: WO2015/170072
PCT Pub. Date: Nov. 12, 2015

(65) Prior Publication Data
US 2017/0177055 A1    Jun. 22, 2017

(30) Foreign Application Priority Data
May 6, 2014   (GB) .................................. 1407927.1

(51) Int. Cl.
*G06F 1/32*  (2019.01)
*G06F 1/08*  (2006.01)
*G06F 1/324* (2019.01)

(52) U.S. Cl.
CPC .............. *G06F 1/324* (2013.01); *G06F 1/08* (2013.01)

(58) Field of Classification Search
None
See application file for complete search history.

(56) References Cited

U.S. PATENT DOCUMENTS 6,002,282  A    12/1999  Alfke
6,326,826  B1   12/2001  Lee et al.
6,445,228  B1 *  9/2002  Nguyen ................... G06F 1/08
                                                                    327/115

(Continued)

FOREIGN PATENT DOCUMENTS

WO       2004/084070       9/2004

OTHER PUBLICATIONS

International Preliminary Report on Patentability dated Nov. 17, 2016 in PCT/GB2015/050736, 7 pages.

(Continued)

*Primary Examiner* — Jaweed A Abbaszadeh
*Assistant Examiner* — Cheri L Harrington
(74) *Attorney, Agent, or Firm* — Nixon & Vanderhye P.C.

(57) ABSTRACT

An electronic device (20) has a clock path (24) for propagating a clock signal and a clock propagating element (26) on the clock path. An analogue element (30) coupled to the clock path (24) varies, in dependence on an analogue level of a first signal (32), a switching delay for the clock propagating element (26) to trigger a transition of the clock signal. The first signal is a digitally sampled signal. This provides a mechanism for providing a fast reduction in clock frequency even if the first signal is a metastable signal, which is useful for avoiding errors causes by voltage drops.

23 Claims, 7 Drawing Sheets

(56) References Cited

U.S. PATENT DOCUMENTS

| | | | |
|---|---|---|---|
| 6,842,057 B1 | 1/2005 | Gauthier et al. | |
| 7,176,738 B1 | 2/2007 | Hwang et al. | |
| 7,330,081 B1* | 2/2008 | Asa | H03K 3/0315 331/179 |
| 2002/0047739 A1 | 4/2002 | Mace | |
| 2003/0184347 A1 | 10/2003 | Haroun et al. | |
| 2004/0158761 A1* | 8/2004 | Matsuoka | G06F 1/08 713/600 |
| 2004/0183613 A1* | 9/2004 | Kurd | G01K 7/32 331/186 |
| 2007/0013421 A1 | 1/2007 | Wang | |
| 2007/0096789 A1* | 5/2007 | Desai | G06F 1/04 327/291 |
| 2008/0204158 A1* | 8/2008 | Weder | H03K 3/0315 331/177 V |
| 2009/0224834 A1* | 9/2009 | Young | H02M 3/07 330/296 |
| 2013/0159757 A1* | 6/2013 | Park | G11C 15/00 713/400 |
| 2014/0077857 A1* | 3/2014 | Poulton | H03K 5/133 327/278 |
| 2014/0314191 A1* | 10/2014 | Yang | H03K 5/134 375/371 |
| 2016/0072491 A1* | 3/2016 | Bowman | H03K 5/13 327/276 |
| 2016/0241241 A1* | 8/2016 | Makipaa | G06F 1/04 |

OTHER PUBLICATIONS

International Search Report and Written Opinion of the ISA for PCT/GB2015/050736 dated Jun. 12, 2015, 9 pages.

Search Report for GB1407927.1 dated Nov. 17, 2014, 3 pages.

Bowman et al., "A 22 nm All-Digital Dynamically Adaptive Clock Distribution for Supply Voltage Droop Tolerance", *IEEE Journal of Solid-State Circuits*, vol. 48, No. 4, Apr. 2013, pp. 907-916.

Kim et al., "A 32nm, 0.9V Supply-Noise Sensitivity Tracking PLL for Improved Clock Data Compensation Featuring a Deep Trench Capacitor Based Loop Filter", *2013 Symposium on VLSI Circuits Digest of Technical Papers*, Jun. 12-14, 2013, pp. C162-C163.

Kurd et al., "Next Generation Intel® Core™ Micro-Architecture (Nehalem) Clocking", *IEEE Journal of Solid-State Circuits*, vol. 44, No. 4, Apr. 2009, pp. 1121-1129.

* cited by examiner

CLOCK FREQUENCY REDUCTION FOR AN ELECTRONIC DEVICE

This application is the U.S. national phase of International Application No. PCT/GB2015/050736 filed 13 Mar. 2015 which designated the U.S. and claims priority to GB Patent Application No. 1407927.1 filed 6 May 2014, the entire contents of each of which are hereby incorporated by reference.

The present technique relates to the field of electronic devices. More particularly, the present technique relates to handling of a clock signal within an electronic device.

Current generation electronic devices (e.g. CPU and GPU products implemented in nanoscale processes) characteristically suffer from performance-limiting power supply noise. This arises due to ever increasing current density drawn through finite power supply impedance. Supply voltage margins are used to ensure reliable digital circuit timing at the cost of increased power consumption. To circumvent excessive supply voltage margins, circuit-level tolerance to supply-voltage noise is highly desirable.

A number of techniques are available to increase robustness to supply voltage noise, by adapting supply voltage and/or clock frequency based on a feedback signal which varies with supply voltage noise. Two known approaches to generate this feedback signal are timing-error detection ("Razor"—e.g. see WO 2004/084070 A1) and "canary" schemes, both of which measure supply voltage noise indirectly though variation in circuit delay. A third approach is to measure supply voltage noise directly, using some kind of analog-to-digital converter. These schemes ultimately all generate a digital control signal which indicates there is significant voltage noise or timing degradation. The intention is that this signal can be used to increase the supply voltage, reduce the clock frequency, or stop the clock entirely for a brief period. These actions can thus prevent circuit timing failures. However, by their very nature, both Razor and canary circuits have asynchronous properties and hence the digital feedback signal is potentially subject to metastability. Hence, a synchronizer circuit is required to minimize metastability, at the cost of number of cycles of delay.

Due to the rapid changes in voltage supply that can occur due to high frequency supply noise events, the faster the adaptation, the greater the margin reduction from adaptive systems. Dynamic voltage scaling (DVS) is typically fairly slow in a current generation SoC, because the supply regulator is off-chip and also because it typically has modulation bandwidth of only ~100 kHz. Since the clock is often synthesized on-chip in a PLL, dynamic frequency scaling (DFS) allows fast changes, but again, there are typically strong limitations in the lock time due to the low-bandwidth loop-filter and as such, the rate at which the clock frequency can be changed is typically also in the range of ~100 kHz. While it is possible to increase this loop bandwidth, there is a dichotomy between loop bandwidth and jitter (phase noise), which means this is not practical. Very fast methods for reducing clock frequency, such as switching to a divide-by-2 clock or switching between two PLL clocks cannot be done with a potentially metastable control signal. The reason for this is the risk of a metastable or malformed clock, which would be catastrophic. The same is true when using clock gating instead of a switchable divide-by-2.

In summary, there is a strong requirement for a technique for fast reduction of clock frequency in an electronic device that is robust to metastable control signals.

Viewed from one aspect, the present technique provides an electronic device comprising:

a clock path configured to propagate a clock signal;

a clock propagating element configured to receive an upstream clock signal from an upstream portion of the clock path and to output a downstream clock signal to a downstream portion of the clock path; and an analogue element coupled to the clock path and configured to vary, in dependence on an analogue level of a first signal received by the analogue element, a switching delay for the clock propagating element to trigger a transition of the downstream clock signal in response to a transition of the upstream clock signal, wherein the first signal is a digitally sampled signal.

An electronic device may have a clock path for propagating a clock signal, and a clock propagating element on the clock path which receives an upstream clock signal from an upstream portion of the clock path and outputs the downstream clock signal to a downstream portion of the clock path. For example, the clock propagating element may be an inverter or buffer on the clock path. The inventors of the present technique recognised that a fast reduction in clock frequency can be achieved by providing an analogue element coupled to the clock path. The analogue element receives a first signal and triggers, depending on the analogue level of the first signal, a variation in a switching delay for the clock propagating element to trigger a transition of the downstream clock signal in response to a transition of the upstream clock signal. Although the first signal is a digitally sampled signal, the analogue element treats it as an analogue signal so that the switching delay of the clock propagating element varies continuously based on the analogue level of the first signal. This means that even if the first signal is metastable, this cannot cause malformed clock on the clock path because an intermediate level of the first signal merely changes the extent by which the switching delay of the clock propagating element is adjusted, but does not change the profile of the clock signal. This contrasts with a digital switch or digital element which may exhibit completely different behaviour depending on whether the first signal is high or low, and so if a signal provided to the digital element is metastable then this could have unpredictable and catastrophic consequences. The longer the switching delay of the clock propagating element, the lower the clock frequency in the downstream portion of the clock path. Therefore, by adjusting the switching delay dependent on the analogue level of an incoming first signal, a very fast frequency reduction can be achieved. Unlike previous approaches using a synchroniser to eliminate metastability in the control signal, the present technique allows the reduction in clock frequency to take effect within one clock cycle.

The first signal may be any signal which indicates that the clock frequency should be reduced. For example, the first signal may be an error signal which indicates that an error has occurred in the electronic device, or a voltage change signal which indicates that a change in supply voltage for the electronic device has been detected. More particularly, the voltage change signal may be a voltage drop signal indicating that there has been a drop in the supply voltage. When there is an error or a drop in supply voltage, then processing paths within the electronic device may not complete their processing before the end of a cycle of the clock signal, so that signals from the processing paths may be sampled too early causing incorrect processing results. By increasing the switching delay of the clock propagating element when an error or voltage drop is detected, the clock frequency can quickly be reduced to provide more time for signals to traverse processing paths before the end of a clock cycle. In other examples the first signal may not signal any specific event within the electronic device, but may simply be a signal input from outside the electronic device to instruct the device to operate at a lower frequency.

The electronic device may have a sensing element which detects a predetermined condition in the electronic device and generates the first signal dependent on whether the predetermined condition has been detected. For example, the predetermined condition could be the occurrence of an error, a voltage change, a temperature change, and so on. The sensing element may for example be a temperature sensor, or a dummy timing path corresponding to the critical path through a processing element of the electronic device which senses the predetermined condition if a signal does not reach the end of the dummy timing path within a clock cycle of the clock signal. Also, the sensor could be a detector which detects timing errors directly from the real processing paths of the electronic device. For example, the "Razor" technique mentioned above as developed by the University of Michigan and ARM Limited of Cambridge, UK, may be used as the sensing element, in which timing errors in a processing path are detected by detecting late transitions of signals after the end of the clock cycle in which the signal should have transitioned, or by comparing a main latch sampled under control of the clock signal against a delayed latch sampled slightly later than the main latch. Also, a voltage detector coupled to the power supply may be provided to sense a drop in supply voltage. Regardless of the type of sensing element, when a condition requiring a reduction in clock frequency is detected, the first signal can be generated to trigger the analogue element to increase the delay through the clock propagating element so as to slow the clock frequency.

In one example, the sensing element may comprise a latch and the first signal may comprise an output of the latch. This means that the first signal is a digitally sampled signal. Nevertheless, the first signal may still be metastable and so treating the digital signal as an analogue signal at the analogue element helps to ensure correct processing regardless of whether the first signal is metastable.

The analogue element may trigger an increase in the switching delay of the clock propagating element in response to a transition of the first signal from a first state towards the second state (this transition may be the transition which signals an error, a voltage drop, or other condition signifying that the frequency should be reduced). In response to the opposite transition of the first signal towards the first state following the increase in switching delay, the analogue element may then trigger a decrease in switching delay to reset the clock frequency to the normal level.

One issue that may arise when resetting the clock frequency to its normal level is that the sudden increase in frequency could in some systems cause temporary errors in the electronic device. To address this, it is possible to a provide a reset element which resets at least one component of the electronic device to a predetermined state in response to the transition of the first signal towards the first state before the analogue element triggers the decrease in the switching delay of the clock signal. For example, the at least one component of the electronic device may be a clock generator which can generate the upstream clock signal at several different frequencies, and the predetermined state may for example be resetting the clock generator to generate the clock signal at the lowest frequency supported by the clock generator. By resetting the clock frequency to the lowest level before triggering the analogue element to decrease the switching delay, potential errors can be avoided. For example, a phased locked loop (PLL) may be reset to a lower frequency. Other examples of resetting components of the electronic device may for example include resetting various storage elements or holding the processing pipeline in a known state while the clock frequency is increased.

Also, when returning the clock frequency to its normal level, a sudden increase of the switching delay of the clock propagating element back to its normal level may sometimes cause errors. At the point when the first signal switches back towards the first state, the previous clock edge would be later than normal because it was delayed by the longer switching delay through the clock propagating element, but the next clock edge may be non-delayed, so that there is a cycle when the time between successive clock edges is shorter than normal. This may cause errors if there are timing paths which cannot complete their processing within the shorter time available.

To address this issue, a control element may be provided which controls the analogue element to provide a gradual reduction of the switching delay of the clock propagating element in response to the transition of the first signal towards the first state. For example, the control element may comprise a capacitor which is coupled to the signal line carrying the first signal to the analogue element, and a weak discharge path coupling this signal line to ground. When the first signal is in the second state, the capacitor may be charged. When the first signal returns to the first state, the capacitor may continue to charge the analogue element as if the first signal was in the second state. The discharge path may weakly discharge the signal supplied to the analogue element, to gradually decrease the switching delay through the clock propagating element. Hence, the control element may effectively retain the first signal for several cycles so that deasserting the first signal does not immediately return the clock frequency to its normal level. The return to the normal clock frequency can be spread out over several cycles to reduce the extent by which any one cycle is shortened, reducing the likelihood of errors. The control element may enforce a minimum length of time over which the slow-down occurs, even if the error signal is very brief or glitches.

The analogue element may be provided in different ways. In general, any element which provides a continuous variation of the switching delay of the clock propagating elements based on the analogue level of the first signal may be used.

For example, the analogue element may have a variable resistance which depends on the analogue level of the first signal. The analogue element may comprise at least one variable resistor which is coupled in series with the clock propagating element on the clock path. If the resistance of the analogue element is increased, then less current may be received by the clock propagating element and so the charge at the clock propagating element may rise more slowly, causing a slower switching time and therefore a lower clock frequency downstream of the analogue element. Conversely, decreasing the resistance of the analogue element may increase the switching speed to produce a faster clock frequency. Similarly, a variable resistor (e.g. a resistor or a transistor) may be coupled between the clock propagating element and a power supply node for the clock propagating element. The higher the resistance of the variable resistor, the slower the switching delay of the clock propagating element.

In another example, the analogue element may comprise at least one capacitive element which is selectively coupled to the clock path in dependence on the analogue level of the first signal. In general, if more capacitance is coupled to the clock path, then some of the current flowing along the clock path will charge or discharge the capacitance and so the clock propagating element will be charged or discharged less quickly, causing a slower switching speed and hence a slower clock frequency. For example, the analogue element may have a control device (such as a resistor or a transistor) which is coupled between the clock path and the at least one capacitive element. The control device may have a variable resistance depending on the analogue level of the first signal. When an event occurs which requires a reduction in clock frequency, then the first signal may control the control device to reduce its resistance in dependence on the analogue level of the first signal, so that more of the capacitance of the capacitive element is sensed by the signal on the clock path and so the capacitive element has a greater effect, reducing the clock frequency.

Another example of the analogue element may be a current regulating element which triggers a continuous variation of a current supplied to the clock propagating element in dependence on the analogue level of the first signal. In general, the smaller the current to the clock propagating element, the longer its switching delay, and hence the slower the frequency of the downstream clock signal output by the clock propagating element. In one example, the analogue element may be at least one tristate inverter which is coupled in parallel with the clock path, with the tristate inverter having a variable resistance depending on the analogue level of the first signal. In general, the lower the resistance of the tristate inverter the greater the current flowing through tristate inverter and hence the greater the current charging the clock propagating element, the shorter the switching delay and the faster the clock frequency. When the clock frequency needs to be reduced, then the first signal may increase the resistance of the tristate inverter (for example, by placing the tristate inverter in a current starving state) so that less current charges the clock propagating element and so the switching delay is longer.

In some cases, the analogue element may be able to operate in one of several different operating states selected in response to a tuning signal, with each operating state triggering a different amount of variation of the switching delay of the clock propagating element in response to a given analogue level of the first signal. For example, different amounts of resistance, capacitance, or current regulation capability may be switched into the clock path depending on the tuning signal. This allows the circuit to select the extent by which the clock frequency is reduced when triggered by the analogue level of the first signal.

In some examples there may be multiple clock propagating elements at different points of the clock path, each clock propagating element receiving an upstream clock signal from the portion of the clock path upstream of that clock propagating element, and outputting a downstream clock signal to the portion of the clock path downstream of that clock propagating element. Multiple analogue elements may be provided with each analogue element controlling the switching delay of a corresponding clock propagating element based on the analogue level of the first signal. This can be useful for several reasons. Firstly, each analogue element may only be able to provide a limited increase in the switching delay of a clock propagating element, and so if a greater frequency reduction is desired than can be provided by one analogue element, multiple analogue elements can be provided. Also, by providing multiple analogue elements, it is possible to tune the amount by which the clock frequency is reduced in response to the first signal, since different analogue elements may be activated in different combinations depending on a tuning signal.

Also, in embodiments using a capacitive element for the analogue element as discussed above, there may be a charge injection effect in which, as the resistance of the control device for the capacitive element is decreased to expose the capacitance more strongly to the clock path, there is a rapid spike in the charge supplied to the clock path, which may be undesirable. In general, the charge injection effect is proportional to the capacitance of the capacitive element being connected to the clock path. Therefore, by providing multiple analogue elements with lower capacitance which together provide the same reduction in clock frequency as a single larger capacitance, the charge injection effect can be reduced.

The electronic device may have a clock generator which generates the upstream clock signal on the clock path. The clock generator may be of various types, such as a ring oscillator, crystal oscillator, phase locked loop (PLL), or voltage control oscillator (VCO) for example.

In some cases, the clock propagating element may be part of the clock generator. For example, the clock propagating element may be an inverter within a ring oscillator functioning as the clock generator. In this case, then the upstream portion of the clock path may be a portion of the signal path through the clock generator. When the first signal is received, the variation in switching delay through the clock propagating element may affect the clock frequency of the clock signal output by the clock generator.

In other examples, the clock propagating element may be coupled to the clock path downstream from the clock generator. In this case, then the analogue element may be outside the clock generator, and in this case the clock generator would generate the upstream clock signal at the same frequency regardless of the first signal, and the reduction of clock frequency would occur downstream from the clock generator.

The electronic device may be any device which uses or is controlled by a clock signal in any way. For example, the electronic device may be an integrated circuit. The device may generally be a digital circuit, although the first signal is nevertheless treated as an analogue signal by the analogue element.

The electronic device may also be an agent device, control device or sensor in a wireless sensor network or the Internet of Things. For example, a sensor may sense an external parameter such as temperature, and in response to some conditions it may be desirable to reduce the frequency of the clock signal to save power. The analogue element discussed above provides a fast reduction in frequency of the clock signal without being adversely affected by metastability in the first signal.

Viewed from another aspect, the present technique provides an electronic device comprising:

clock path means for propagating a clock signal;

clock propagating means for receiving an upstream clock signal from an upstream portion of the clock path means and for outputting a downstream clock signal to a downstream portion of the clock path means; and analogue means, coupled to the clock path means, for varying, in dependence on an analogue level of a first signal received by the analogue means, a switching delay for the clock propagating means to trigger a transition of the downstream clock signal in response to a transition of the upstream clock signal, wherein the first signal is a digitally sampled signal.

Viewed from a further aspect, the present technique provides a method for an electronic device, comprising:

receiving an upstream clock signal from an upstream portion of a clock path;

in response to the upstream clock signal, a clock propagating element outputting a downstream clock signal to a downstream portion of the clock path; and using an analogue element coupled to the clock path, varying, in dependence on an analogue level of a first signal, a switching delay for the clock propagating element to trigger a transition of the downstream clock signal in response to a transition of the upstream clock signal, wherein the first signal is a digitally sampled signal.

Viewed from a further aspect, the present technique provides a computer readable storage medium storing a standard cell library comprising data defining a plurality of standard cells for inclusion in an integrated circuit layout, at least one of the standard cells comprising:

a clock path configured to propagate a clock signal;

a clock propagating element configured to receive an upstream clock signal from an upstream portion of the clock path and to output a downstream clock signal to a downstream portion of the clock path; and an analogue element coupled to the clock path and configured to vary, in dependence on an analogue level of a first signal received by the analogue element, a switching delay for the clock propagating element to trigger a transition of the downstream clock signal in response to a transition of the upstream clock signal, wherein the first signal is a digitally sampled signal.

The present technique may also be implemented in the form of a standard cell library which has data defining standard cells for inclusion in an integrated circuit layout in an automated design process. The design process may include a placement step for placing standard cells selected from the library in an integrated circuit layout depending on functional requirements of the circuit specified by the user. At least one of the standard cells may have a clock path, a clock propagating element and an analogue element as discussed above so that the designed integrated circuit layout produced using the standard cell library can have the fast clock frequency reduction functionality discussed above. The standard cell library may in some embodiments be stored on a non-transitory storage medium.

Further aspects, features and advantages of the present technique will be apparent from the following description which is to be read in conjunction with the drawings in which.

Figure 1:
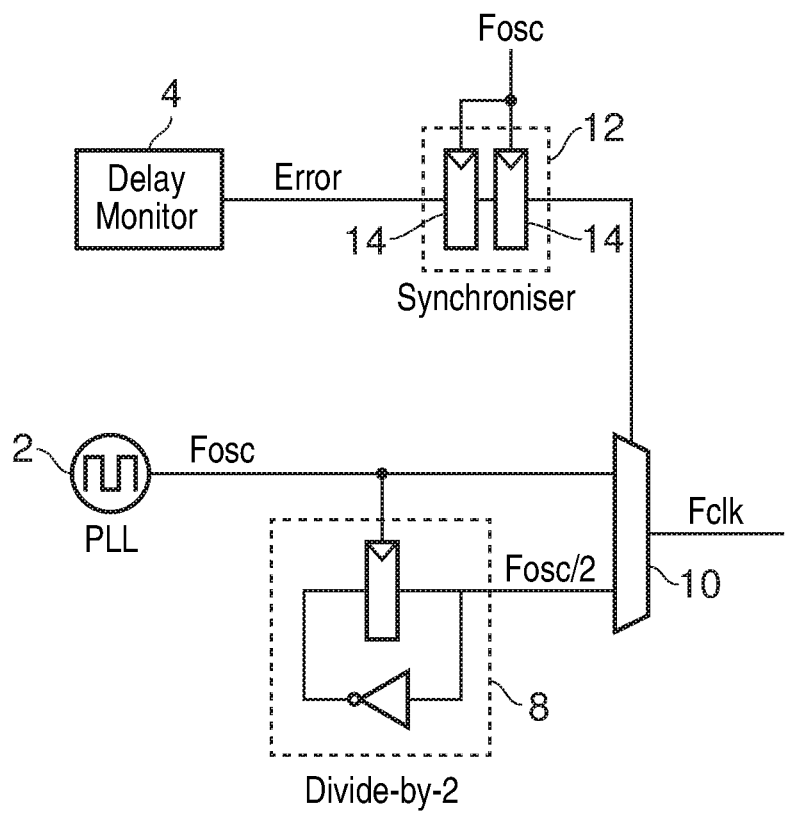
FIG. 1 illustrates a known method of reducing a clock frequency in response to an error signal.

Very fast voltage variation in an integrated circuit may result in catastrophic state upset due to failure of a critical timing path. When the voltage is reduced then signals may propagate more slowly through processing paths and so if the clock signal for the circuit remains at the same frequency then this could result in some paths not completing in time, causing errors. To prevent this, it can be desirable to reduce the clock frequency as soon as possible following detection of an adverse event. FIG. 1 shows a known circuit for reducing the clock frequency in response to a detected error event, such as a reduction in supply voltage level. A phase locked loop (PLL) generates a clock signal Fosc. A delay monitor 4 issues an error signal 6 when the voltage drop is detected. A divide-by-2 circuit 8 is provided which receives the clock signal output by the PLL 2 and generates a half-frequency clock signal Fosc/2. The normal clock signal and the half-frequency clock signal are provided to a multiplexer 10 which selects one of the two clock signals depending on the error signal 6. Hence, when a voltage drop is detected the error signal may be used to switch to a half frequency clock which is then used to control the rest of the device. However, since the multiplexer 10 is a digital switch, then in order to switch safely to the half frequency clock it is necessary to have a control signal with a definite 0 or 1 value. If the control signal is ever metastable (i.e. the signal has a value between 0 and 1) or glitches, then there is a risk of poorly defined clock wave forms which can result in catastrophic failure. For many types of delay monitor 4, such as canary circuits which provide a dummy timing path simulating the timing through a real path of the circuit, or a "Razor" circuit which detects timing errors in the actual circuit, there is a significant risk of metastability because the timing error detection circuits are often asynchronous and so their outputs cannot be guaranteed to be free of metastability. A synchroniser 12 is therefore provided as shown in FIG. 1 to ensure that the signal provided to the multiplexer 10 cannot be metastable. While this results in safe switching to a half-frequency clock signal, the synchroniser 12 incurs several clock cycles latency (often two cycles) because the synchronizer comprises latches 14 which delay the error signal. This latency is extremely undesirable because it will delay the onset of the lower frequency clock and so the system will still run for a number of cycles at the higher frequency after the detection of the adverse error condition, during which time it is exposed to the risk of catastrophic timing failure. Since worst case voltage drop events are not instantaneous but instead occur over a number of cycles, the time it takes for the system to react to this event and reduce clock frequency is critical. Therefore, the known circuit of FIG. 1 does not safely guard against the risk of failure due to voltage variation.

Figure 2:
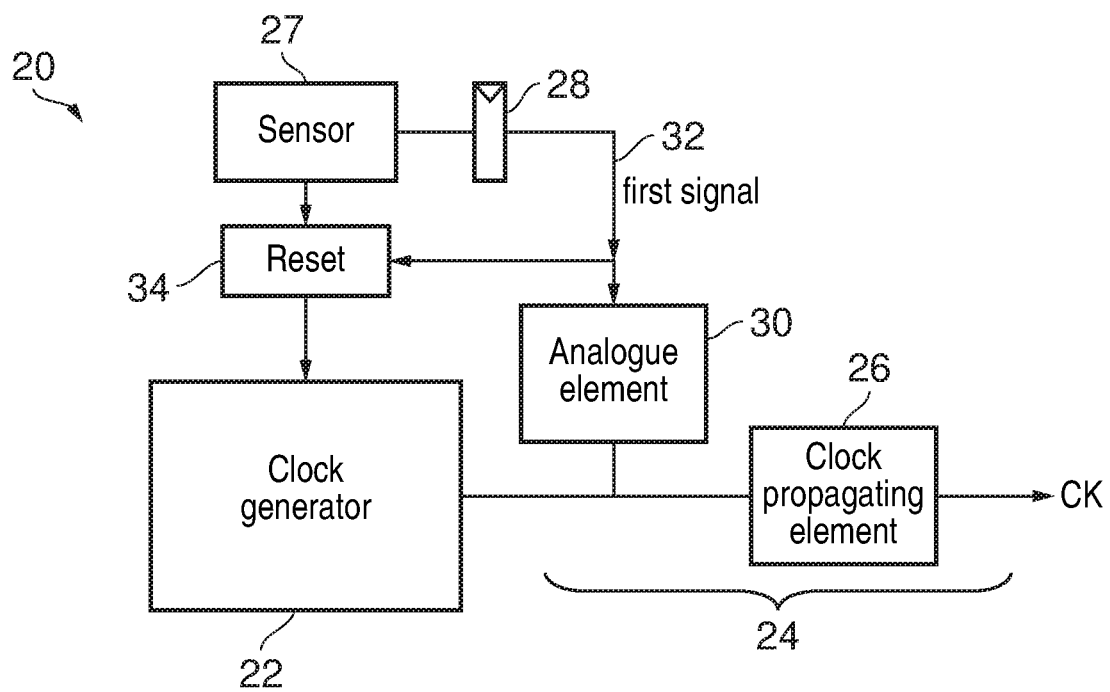
FIG. 2 illustrates an example of an electronic device having an analogue element for varying the switching delay of a clock propagating element in response to a first signal.

FIG. 2 illustrates a electronic circuit 20 according to the present technique. The device 20 has a clock generator 22 for generating a clock signal which is output on a clock path 24. A clock propagating element 26 is provided on the clock path 24. The clock propagating element 26 acts as a repeater for boosting the clock signal to avoid losses due to resistances along the clock path. The clock propagating element 26 may for example be an inverter, a buffer, or a logic gate. A sensing element 27 is provided for detecting an error condition which requires a reduction in clock frequency and outputting a first signal 32 when the condition is detected. The sensing element 27 includes a latch 28 which digitally samples the first signal (the delay monitor 4 of FIG. 1 would include a similar latch). An analogue element 30 is coupled to the clock path 24 for controlling the switching delay of the clock propagating element 26 in response to an analogue level of the first signal 32. Although the device 20 is a digital circuit, the first signal 32 is treated as an analogue signal by the analogue element 30 so that the switching time of the clock propagating element 26 is controlled continuously based on the analogue level of the first signal. This means that even if the first signal 32 is metastable, there is no risk of a malformed clock signal as in FIG. 1, because intermediate levels of the first signal between 0 and 1 would merely cause a different amount of clock frequency reduction but would not change the profile of the clock signal. In general, the actual amount by which the clock frequency is reduced is not particularly important because in practice fast supply voltage noise only has a bounded effect in a short timescale, and so what matters is simply that the clock frequency is quickly reduced to a lower level.

A reset element 34 is also provided for resetting the clock generator 22 when, following a reduction in frequency, the sensing element 27 then indicates that the clock should be reset to its original frequency. The reset element 34 may reset the clock generator 22 to a known state in which it generates the clock frequency with a lower frequency, to reduce the risk that errors could arise within the device 20 when the clock frequency is suddenly increased. In other embodiments, the reset element 34 may for example reset the clock generator 22 before resetting the latch 28 which represents the first signal.

Figure 3:
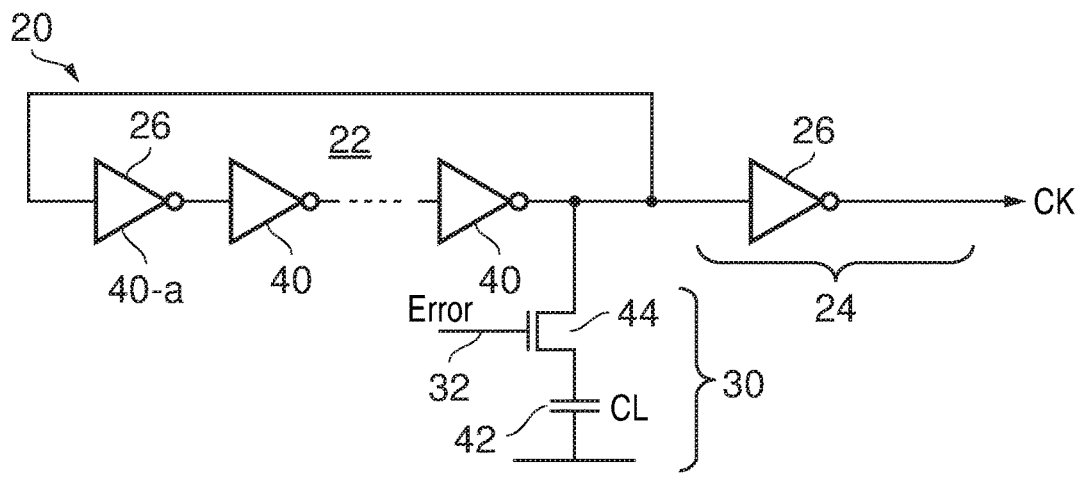
FIG. 3 shows a second example in which the analogue element includes a capacitive element.

FIG. 3 shows a first example of the digital circuit 20 in which the clock generator 22 comprises a ring oscillator having an odd number of inverters 40. When activated, the odd number of inverters 40 cause a signal propagating around the ring to oscillate between high and low levels and this signal may be output onto the clock path 24. In this example, the clock propagating element 26 is an inverter. The analogue element 30 in this example comprises a capacitive element 42 and a control device 44 which is coupled to a node on the clock path. In FIG. 3, the control device 44 is a transistor with its gate coupled to the first signal 32, but in other examples the control device 44 could be a resistor whose resistance varies with the analogue level of the first signal 32. In this embodiment, the analogue element 30 is coupled to a node within the ring oscillator 22, so that in FIG. 3 the inverter 40-a also functions as the clock propagating element since its switching delay will also be affected by the analogue element 30. When the first signal 32 indicates that the clock frequency needs to be reduced, the control device 44 reduces its resistance in proportion to the analogue level of the first signal 32 (e.g. the transistor turns on) and this exposes more of the capacitance 42 to the clock path 24. As more capacitance is shown to the clock path 24, some of the current on the clock path 24 acts to charge or discharge the capacitance 42, and so the clock propagating element 26 is charged or discharged more slowly. This means that the clock propagating element 26 will have a longer switching delay (the delay between receiving a transition of the upstream clock signal and a transition of a downstream clock signal) and so the clock on the downstream clock path has a lower frequency. By treating the first signal 42 as an analogue signal, there is no need for a synchronizer 12 as in FIG. 1 and so the circuit 20 can react to a droop in voltage more quickly to provide a fast reduction in clock frequency, and protect the system from critical path failures. If the error signal is metastable the oscillator frequency will still drop a little and eventually when the error signal resolves it will settle as a safe lower frequency. A metastable error signal 32 cannot corrupt or cause glitches on the output clock and cannot increase the clock frequency, as is a risk in FIG. 1. In addition, with the circuit shown in FIG. 3 there is no risk of a crowbar current providing a DC leakage path, which could occur in FIG. 1 with a metastable signal driving a CMOS gate, since in FIG. 3 there is no DC path to ground from the clock path (the capacitive element 42 blocks any DC path). This circuit can be used in conventional digital or analogue PLL schemes, in which the output clock frequency is much larger than the PLL loop bandwidth. This is typically the case, as PLL bandwidths are normally in the range 10 to 100 kHz while clock frequency for digital embedded systems are typically in the range of 100-2000+ MHz. Hence, very fast changes in the clock output frequency will largely be ignored by the PLL unless they are persistent for a very large number of clock cycles, which is not usually necessary since the voltage drop usually only lasts for a short time.

Figure 4:
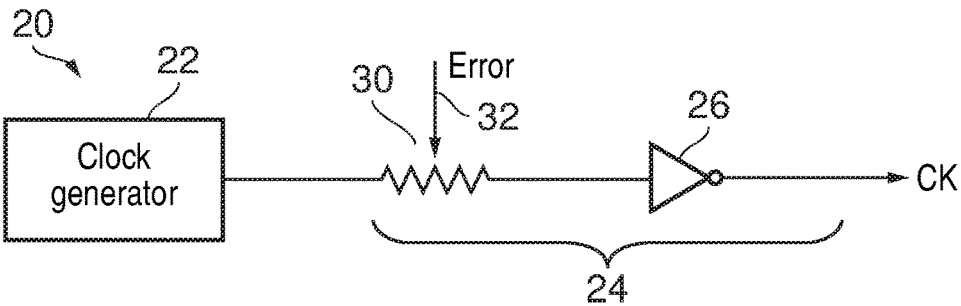
FIG. 4 shows another example in which the analogue element has a variable resistance.

FIG. 4 shows another example in which the analogue element 30 is a variable resistor whose resistance varies based on the analogue level of the first signal. The greater the resistance of the variable resistor, the less current is supplied to the clock propagating element 26 and so the slower the switching speed of the clock propagating element 26. This provides another way of providing fast frequency reduction even when the first signal 32 is metastable.

Figure 5:
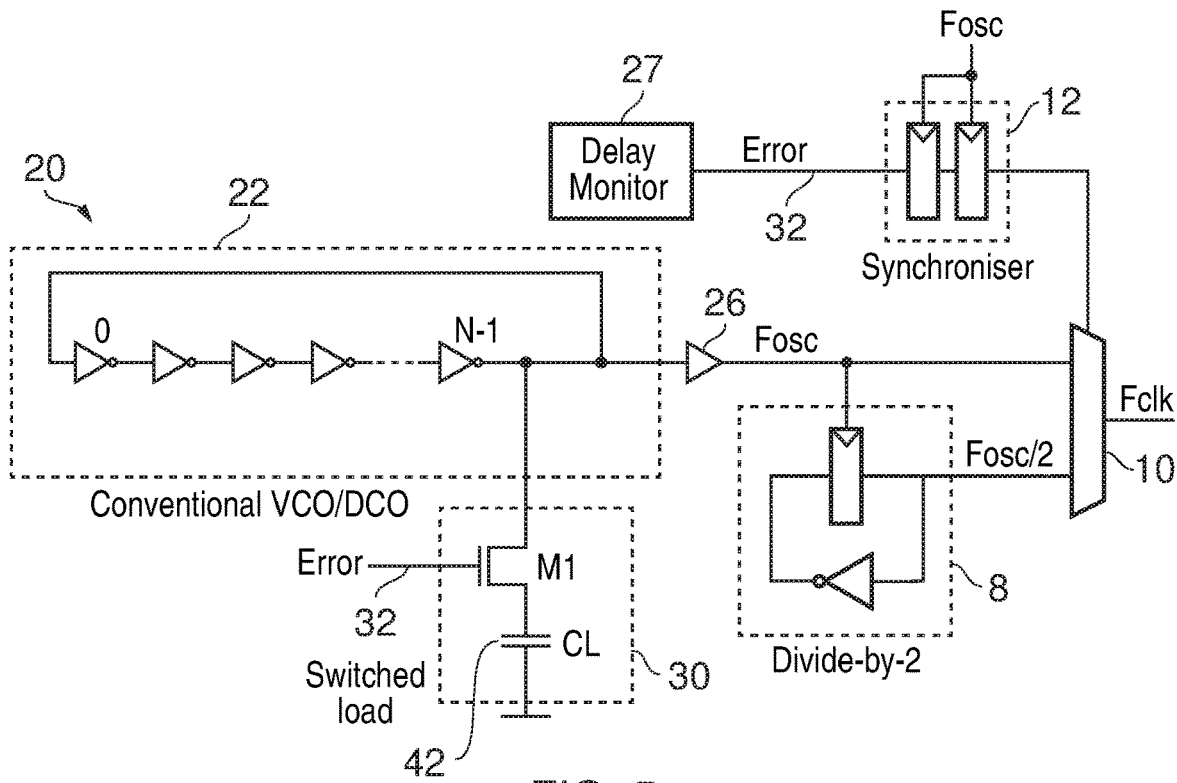
FIG. 5 shows an example in which the present technique can be used in combination with a multiplexer for selecting between clock signals of different frequencies.

FIG. 5 shows another example of the electronic device 20 which is similar to the example shown in FIG. 3 except that it also includes a multiplexer 10, divide-by-2 circuit 8, and synchroniser 12 as in FIG. 1. Hence, the analogue element 30 of the present technique can be used in combination with the known technique of FIG. 1. In response to the error signal 32 detected by the sensor 27, the analogue element 30 initially increases the switching delay of the clock propagating element 26 to reduce the frequency of the normal speed clock Fosc. Once the synchronizer 12 has synchronized the potentially metastable first signal 32, then this can be provided to a digital multiplexer 10 which switches the clock to a half frequency clock generated by the divide-by-2 circuit 8. This approach provides more time for a PLL for example to lock to a lower frequency. Once the detected voltage droop has been resolved or the PLL has been set to a lower operating point then the control signal 32 can be removed. Similarly, the example of FIG. 4 could also be used with the multiplexer 10, divide-by-2 circuit 8 and synchronizer 12 of FIG. 1. The present technique is still useful in such a situation because during the period when the synchroniser 12 synchronises the error signal 32, a fast reduction in frequency of the normal clock can be achieved to reduce the risk of errors in the device 20, before then switching to the lower frequency clock.

Figure 6:
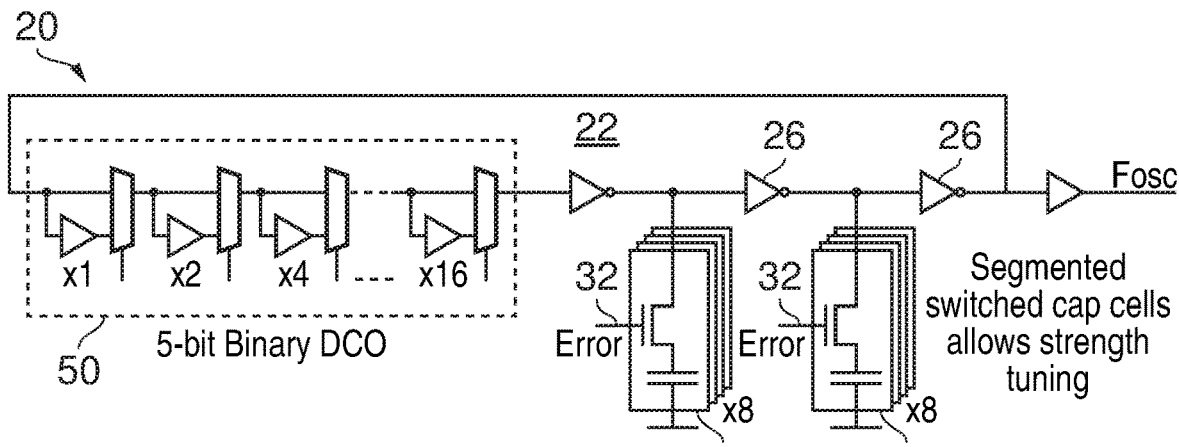
FIG. 6 shows another example in which multiple analogue elements are coupled to the clock path.

FIG. 6 shows another example of the electronic device 20 which differs from FIG. 3 in that two analogue elements 30 are provided corresponding to two different clock propagating elements 26 within the clock path. Again, the analogue elements 30 and clock propagating elements 26 are coupled to a portion of the clock path which is within the clock generator (ring oscillator) 22. Also, unlike in FIG. 3 the ring oscillator 22 is a tunable oscillator which has a portion 50 in which different numbers of inverters can be switched into the ring to provide different delays of the output clock signal. For example, banks of inverters comprising 1, 2, 4, 8 and 16 inverters respectively can be switched in selectively based on a 5-bit binary control signal to produce 32 different levels of output clock frequency. The reset element 34 in FIG. 2 may reset the clock frequency to the lowest available frequency by switching out all the inverters in the tunable portion 50 before resetting the analogue element 30.

Providing separate analogue elements 30 as shown in FIG. 6 is useful because it allows greater tuning of the amount by which the frequency is reduced when the error signal 32 is asserted. Each analogue element 30 may be switched on independently of the other for example. Also, each analogue element 30 may only be able to provide a limited amount of slowdown in the switching speed of the clock propagating element 26 and so by providing several elements 30 a greater reduction can be achieved. Also, in the example shown in FIG. 6 where capacitive elements are provided as the analogue elements 30, segmenting the switched capacitors into a number of stages interspersed with CMOS inverters 26 reduces charge injection and so maintains sharp transitions.

Figure 7:
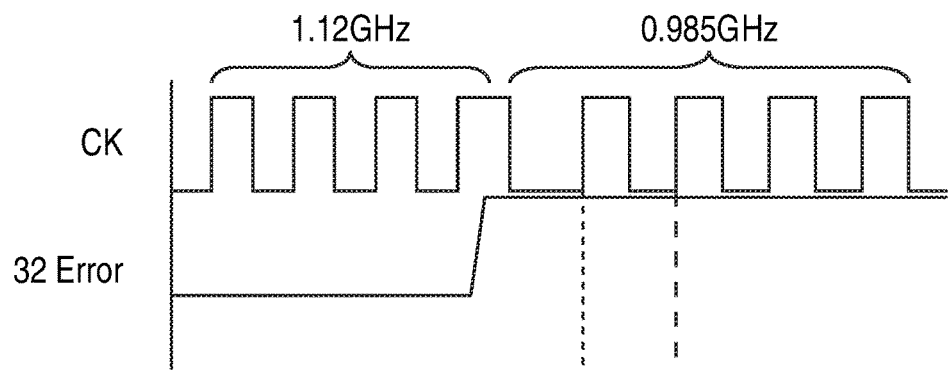
FIG. 7 shows a simulation result illustrating an example of a reduction in clock frequency achieved using the analogue element.

FIG. 7 shows a SPICE simulation for the circuit shown in FIG. 6 at a typical process corner, nominal supply voltage and 25° C. temperature corner. FIG. 7 shows the clock signal CK output by the circuit of FIG. 6 in response to the error signal 32. When the error signal 32 is low then the oscillation frequency is 1.12 GHz. After asserting the error signal 32, the oscillation frequency reduces immediately and settles to 0.985 GHz, which is a reduction of 135 MHz (more than 10%) within a single clock cycle. Hence, a significant slow down can be achieved within one cycle of the detecting the error.

Figure 8:
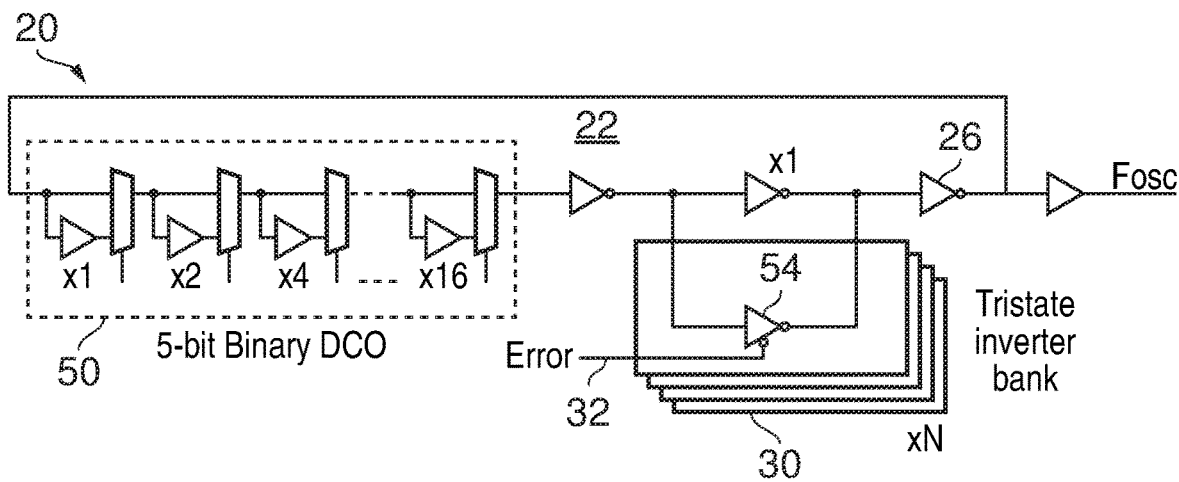
FIG. 8 shows an example in which the analogue element comprises a tristate inverter coupled in parallel with the clock path.

FIG. 8 shows another example of the electronic device 20. The ring oscillator functioning as the clock generator 22 has a tunable portion 50 as in FIG. 6. In this example, the analogue element 30 is provided in parallel with one of the inverters on the clock path 24 and comprises a tristate inverter 54. The tristate inverter operates in a current starving mode when the error signal 32 is active so as to reduce the amount of current passing to a clock propagating element 26. When there is no error then current passes through the tristate inverter 54 so that the clock propagating element is charged more quickly and switches relatively quickly. When an error occurs then the tristate inverter 24 is deactivated which reduces the current driving the input capacitance of the following inverter 26 and reduces the rise time and so reduces the frequency of oscillation. In other examples, a current regulating device other than a tristate inverter 54 could be provided. Again, a metastable error signal 32 only affects the amount of slow down but cannot cause a malformed output clock and cannot increase the clock frequency.

More generally, any voltage based analogue mechanism which controls the oscillator can be provided as the analogue element 30. While FIGS. 3, 5, 6 and 8 show examples where the analogue element 30 and clock propagating element 26 are within the ring oscillator 22, in other examples as shown in FIG. 4 the analogue element 30 and clock propagating element 26 may be placed on a portion of the clock path 24 downstream from the clock generator 22.

Figure 9:
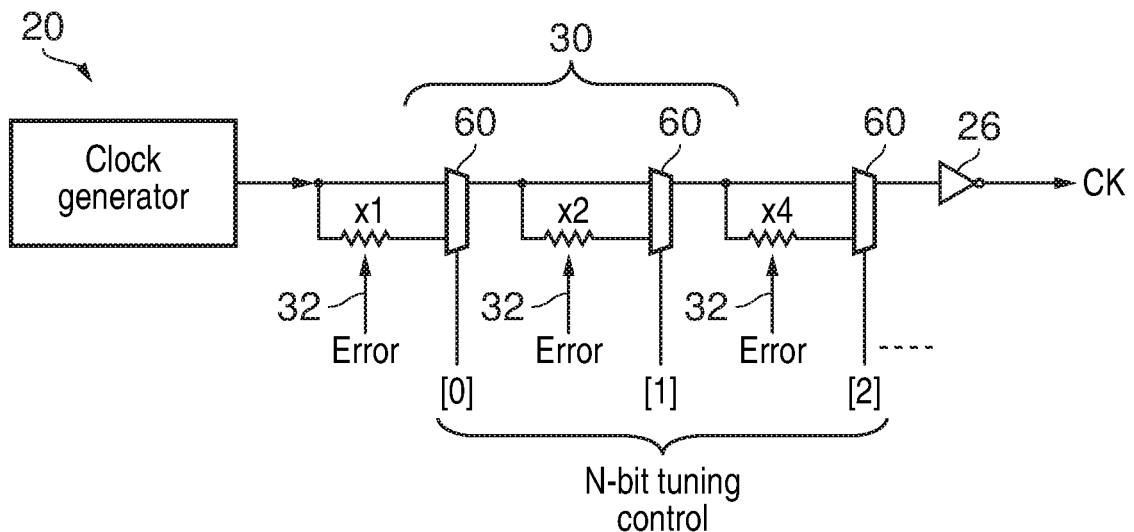
FIGS. 9 and 10 illustrate techniques for tuning the electronic device to provide different amounts of clock frequency reduction.

FIG. 9 shows a first example of the electronic circuit 20 in which a tunable analogue element 30 is provided for providing different amounts of slowdown of the clock signal in response to the error signal. FIG. 9 corresponds to the example in FIG. 4 in which the analogue element 30 comprises variable resistors whose resistance varies continuously with the analogue level of the error signal 32. A number of multiplexers 60 are provided for switching into the clock path different amounts of resistance as selected by an N-bit tuning control signal. By providing different resistances corresponding to increasing powers of 2 (1, 2, 4, etc), a binary control of the amount of resistance can be achieved. For a given state of the error signal 32, different changes in the switching delay of the clock propagating element 26 may be provided depending on which resistances are active or inactive.

Figure 10:
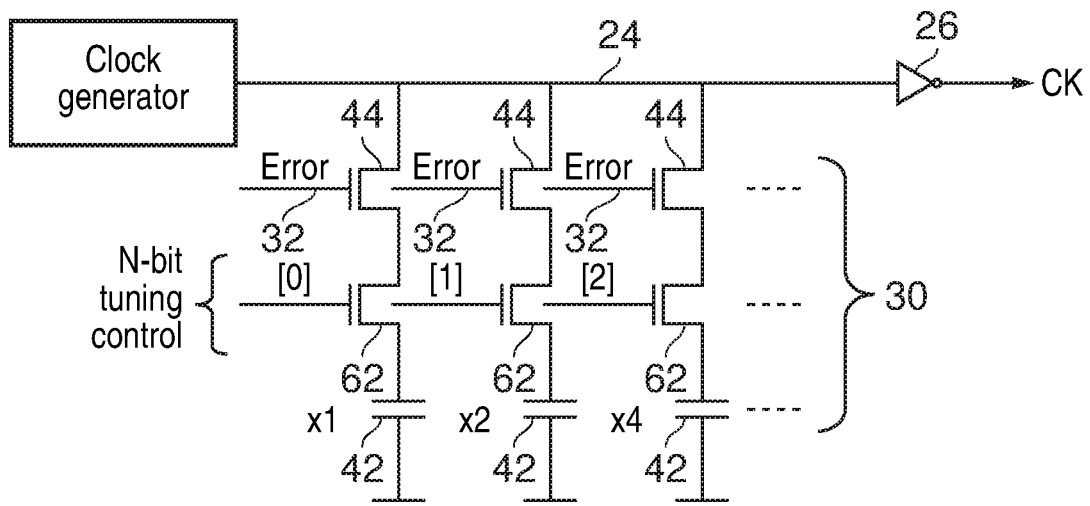

Similarly, FIG. 10 shows an example for the capacitance-based analogue element 30, in which different amounts of clock frequency reduction can be achieved based on an N-bit tuning control signal. Capacitive elements 42 with different capacitances are provided, which can each be switched into the clock path 24 based on the control device 44 whose resistance varies with the analogue level of the error signal 32. Tuning control transistors 62 select based on the tuning control value which capacitances are active, so as to provide binary control of the amount of capacitance.

Figure 11:
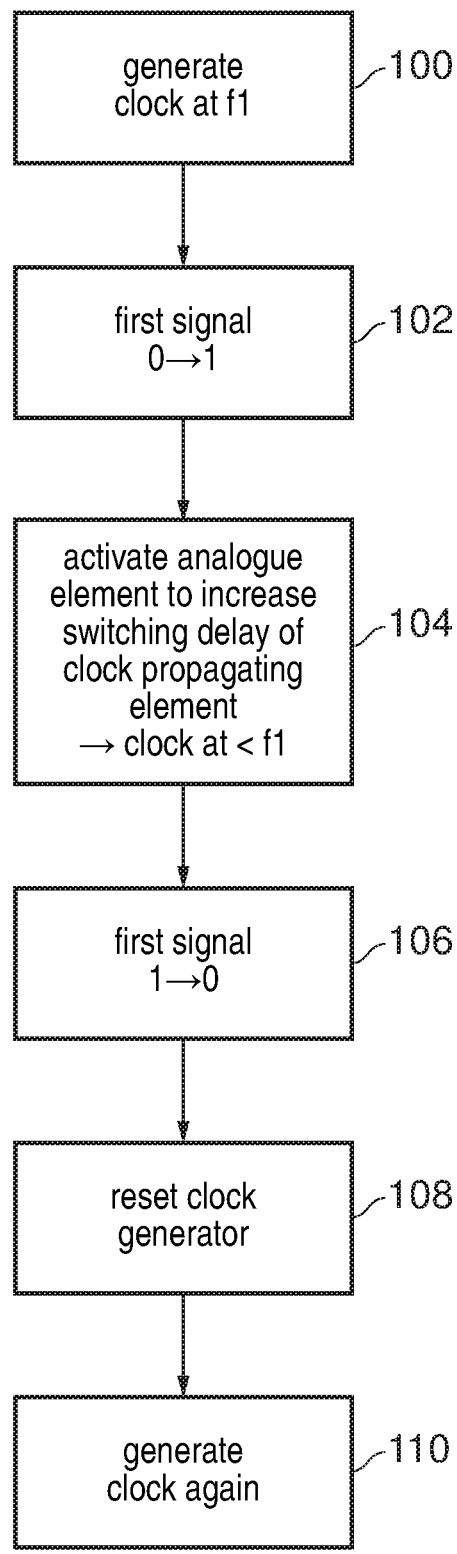
FIG. 11 shows a method of operating an electronic device to reduce clock frequency.

FIG. 11 shows a method of controlling a clock signal in an electronic circuit. At step 100, the clock generator 22 generates the clock signal at a first frequency f1 (which can be a variable frequency selected based on the tunable portion 50 as shown above). At step 102, the sensor 27 senses a condition which requires a lower clock frequency, and so the first signal 32 transitions from 0 to 1 (in other embodiments the opposite transition from 1 to 0 may signal that the frequency should be reduced). At step 104, the analogue element is activated and this increases the switching delay of the clock propagating element 26 so that the output of the clock propagating element transitions more slowly and the clock signal has a frequency less than f1. At step 106, the condition which required the lower clock frequency no longer arises and so the sensor 27 changes the first signal 32 from 1 to 0. The reset element 34 resets the clock generator 22 to its lowest frequency at step 108. Other components of the electronic device 20 may also be reset to a known state. At step 110, the analogue element 30 is deactivated and so the switching delay of the clock propagating element 26 reduces and the clock is then generated without the additional delay provided by the analogue element 30. At this point the clock frequency may be increased from the lowest frequency of the clock generator 22 to the frequency f1 at which the clock was generated before the error condition was detected.

The sensor 27 in FIG. 2 may be of various types, such as a canary circuit, a device which detects timing errors in the processing circuit cell or another sensor such as a temperature sensor. The electronic device 20 may be any digital circuit. In some examples the electronic device 20 may be a sensor in the Internet of Things or a wireless sensor network which uses data from a sensor 26 which senses some external condition.

Figure 12:
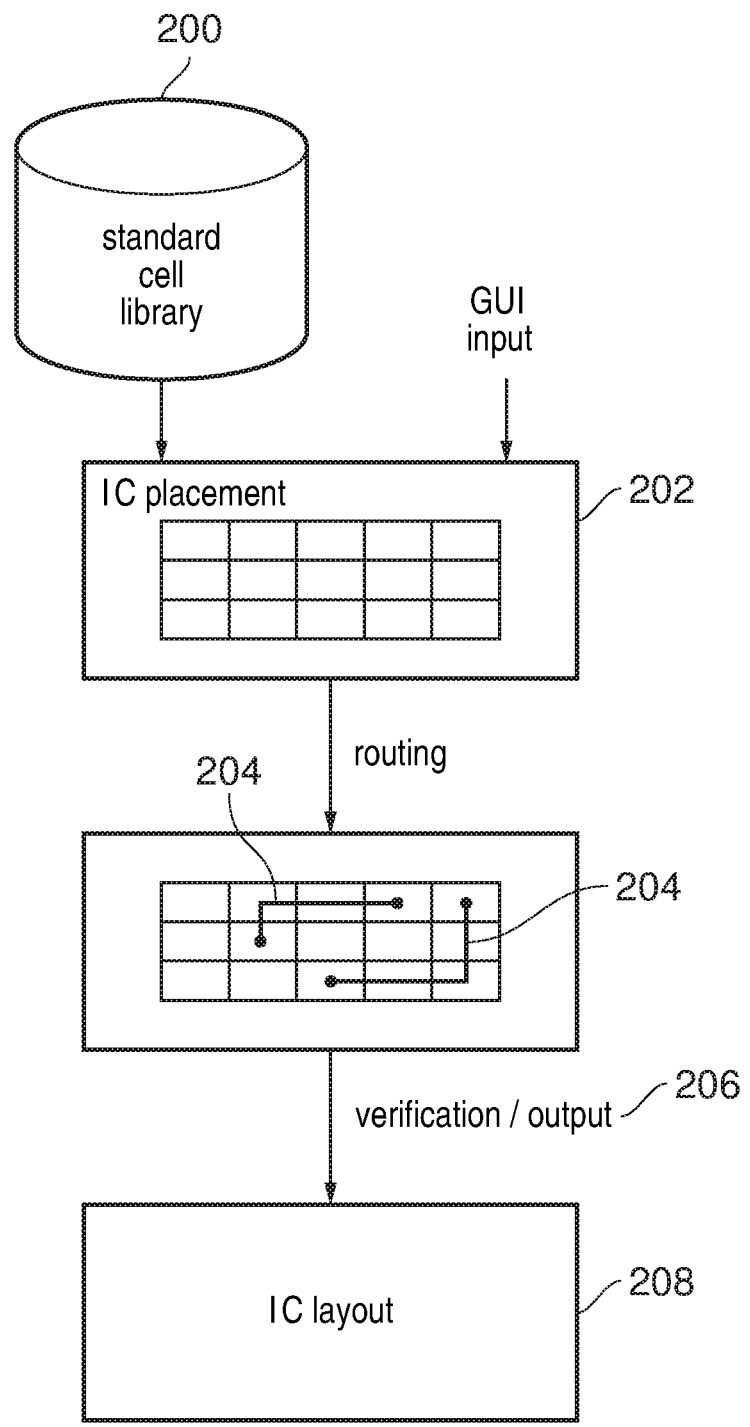
FIG. 12 illustrates an example of a standard cell library used for integrated circuit design.

FIG. 12 shows an example of an automated design process using a standard cell library 200 stored on a recording medium. The library 200 defines a number of standard cell which can be included in an integrated circuit design. The standard cells include at least one cell which has a clock path 24, a clock propagating element 26 and an analogue element 30 as discussed above. The other components of FIG. 2 such as the clock generator 22, the sensor 27 or reset element 34 may not be in the same standard cell. In response to a graphical user interface (GUI) input from the user specifying various functional requirements of the integrated circuit, a design tool performs a placement step to generate an integrated circuit placement 202 which includes a number of cells selected from the standard cell library 200 based on the functional requirements. In a routing step, various connections 204 between the cells required to achieve the functional requirements of the circuit are added. A verification and output step 206 is performed to verify that the designed circuit meets the requirements that were input. A generated integrated circuit layout 208 is then output.

Figure 13:
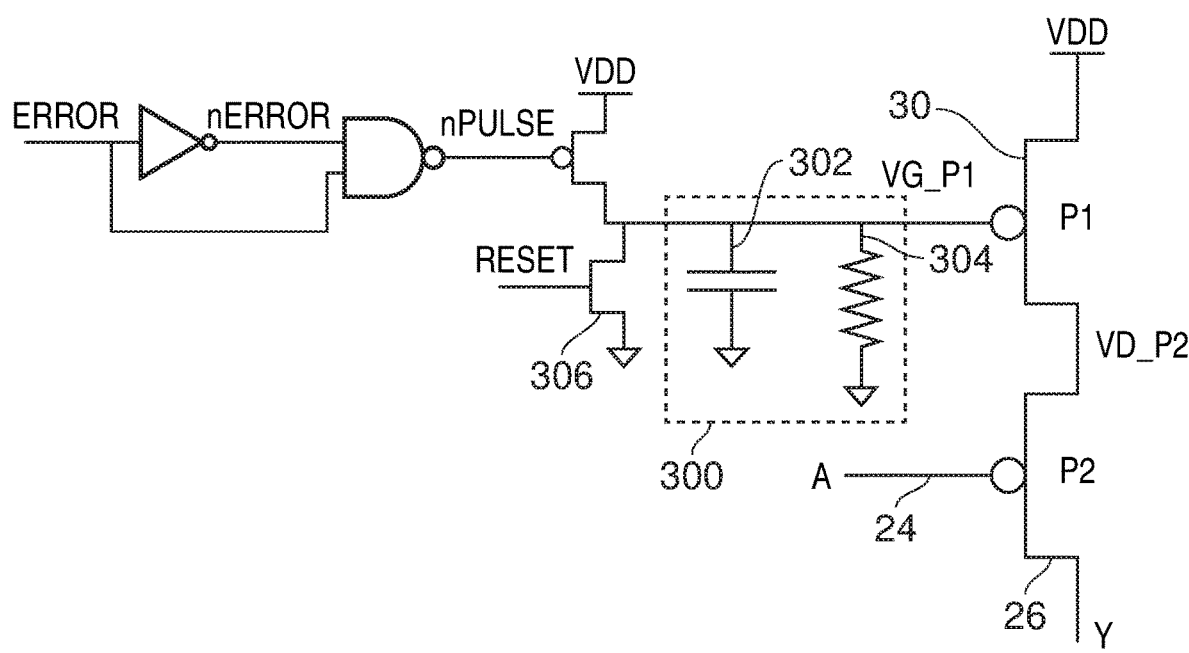
FIG. 13 illustrates an example of a control element for providing a gradual return to a normal clock frequency following a reduction in the clock frequency.

FIG. 13 shows another example of a circuit having an analogue element 30 for controlling the switching delay through a clock propagating element 26 on a clock path 24. In FIG. 13, transistor P2 is a transistor of the clock propagating element 26 (e.g. a pullup transistor of an inverter). The rest of the clock propagating element 26 is not illustrated for conciseness. The delay from the input clock signal A falling to the output clock signal Y rising is controlled by the voltage VG_P1 supplied to a p-type transistor P1 coupled between the transistor P2 and the VDD supply node for the clock propagating element 26. Transistor P1 is the analogue element 30 in this example, and acts as a variable resistor whose resistance is controlled by the voltage level VG_P1 applied to its gate terminal. A control element 300 is also provided, comprising a capacitor 302 and a weak pulldown element 304 (either a resistor or equivalent arrangement built with transistors) coupled to the VG_P1 signal line.

In a normal state (non-error state), the ERROR signal (first signal) is not asserted, VG_P1 is at 0V and transistor P1 is turned fully on, creating a low impedance path from VDD to VD_PG. The pulldown element 304 ensures VG_P1 will tend towards 0V and stay there if VG_P1 is not being actively driven.

In the event of an error/slowdown condition, the ERROR signal is asserted and nPULSE is pulsed low, causing VG_P1 to partially charge, and increasing the impedance of transistor P1, which in turn increases the delay from A falling to Y rising. Therefore, the clock frequency of signal Y is decreased. If the ERROR signal is asserted and not metastable then the fact than an error occurred would be registered by the system, which in turn would be responsible for resetting the voltage level VG_P1 back to zero by asserting the RESET signal to turn on reset transistor 306.

If ERROR was metastable and only asserted for a short time, then in the event of VG_P1 being partially charged, this would eventually return to 0V due to the pulldown resistor 304. The capacitor 302 will retain the high state of the VG_P1 signal so that the transistor P1 remains in the high impedance state for several cycles after the ERROR signal returned to the deasserted state. The pulldown path 304 gradually pulls VG_P1 to ground to gradually turn on the transistor P1, and gradually reduce the switching delay through transistor P2.

This arrangement is advantageous as it provides a mechanism for the slowdown conditional to be effectively latched, by using the capacitor as a storage element. If the control element 300 was not provided, then a metastable error signal could cause a momentary increase in the switching delay through transistor P2 for a few processing cycles. On switching back to the non-asserted state of the error signal, there may be a short clock cycle, because the previous edge would be delayed and the next edge non-delayed. If there is a timing path which cannot complete during this shorter clock cycle, the return to the normal clock frequency could lead to an error. The control element 300 addresses this problem by latching the first signal for several cycles and smoothing out the return to the normal operating state by gradually reducing the delay through transistor P2 so that there is no clock cycle which is much shorter than other clock cycles.

A similar control element 300 may be provided for the previous examples. The control element 300 will generally be most useful when the clock propagating element 26 whose delay is controlled by the analogue element 30 is provided outside the clock generator. The control element 300 is not essential when the clock propagating element 26 is inside a ring oscillator generating the clock signal, because in this case a delay in one clock edge also delays the next clock edge, and so the problem discussed above where one clock cycle is very short does not arise.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An electronic device comprising:
a ring oscillator to generate a clock signal;
a clock path configured to propagate the clock signal;
clock propagating circuitry configured to receive an upstream clock signal from an upstream portion of the clock path and to output a downstream clock signal to a downstream portion of the clock path; and
analogue circuitry coupled to the clock path and configured to vary, in dependence on an analogue level of a first signal received by the analogue circuitry, a switching delay for the clock propagating circuitry to trigger a transition of the downstream clock signal in response to a transition of the upstream clock signal to reduce a frequency of the clock signal, wherein:
the first signal is a digitally-sampled voltage change signal indicative of a change in a supply voltage for the electronic device,
the analogue circuitry is configured to vary the switching delay in dependence on the analogue level of the digitally-sampled voltage change signal;
the clock propagating circuitry is part of the ring oscillator, and
the analogue circuitry is coupled to a node within a loop of the ring oscillator.

2. The electronic device according to claim 1, wherein the first signal comprises an error signal indicative of occurrence of an error in the electronic device.

3. The electronic device according to claim 1, wherein the first signal comprises a voltage drop signal indicative of a drop in a supply voltage for the electronic device.

4. The electronic device according to claim 1, comprising sensing circuitry configured to detect a predetermined condition in the electronic device, and to generate the first signal in dependence on whether the predetermined condition has been detected.

5. The electronic device according to claim 4, wherein the sensing circuitry comprises a latch and the first signal comprises an output of the latch.

6. The electronic device according to claim 1, wherein the analogue circuitry is configured to increase the switching delay of the clock propagating circuitry in response to a transition of the first signal from a first state towards a second state.

7. The electronic device according to claim 6, wherein in response to a transition of the first signal towards the first state following the increase in the switching delay, the analogue circuitry is configured to decrease the switching delay.

8. The electronic device according to claim 7, comprising reset circuitry configured to reset at least one component of the electronic device to a predetermined state in response to the transition of the first signal towards the first state, prior to the analogue circuitry decreasing the switching delay.

9. The electronic device according to claim 8, wherein the at least one component of the electronic device comprises the ring oscillator.

10. The electronic device according to claim 7, comprising control circuitry configured to control the analogue circuitry to provide a decrease of the switching delay over a plurality of clock cycles in response to the transition of the first signal towards the first state.

11. The electronic device according to claim 1, wherein the analogue circuitry has a variable resistance depending on the analogue level of the first signal.

12. The electronic device according to claim 1, wherein the analogue circuitry comprises at least one variable resistor coupled in series with the clock propagating circuitry on the clock path or coupled between the clock propagating circuitry and a power supply node for the clock propagating circuitry.

13. The electronic device according to claim 1, wherein the analogue circuitry comprises at least one capacitor selectively coupled to the clock path in dependence on the analogue level of the first signal.

14. The electronic device according to claim 13, wherein the analogue circuitry comprises a control device coupled between the clock path and the at least one capacitor, the control device having a variable resistance depending on the analogue level of the first signal.

15. The electronic device according to claim 1, wherein the analogue circuitry comprises current regulating circuitry configured to provide an analogue variation of a current supplied to the clock propagating circuitry in dependence on the analogue level of the first signal.

16. The electronic device according to claim 1, wherein the analogue circuitry comprises at least one tristate inverter coupled in parallel with the clock path, the tristate inverter having a variable resistance depending on the analogue level of the first signal.

17. The electronic device according to claim 1, wherein the analogue circuitry is configured to operate in one of a plurality of different operating states selected in response to a tuning signal, the different operating states for varying said switching delay of the clock propagating circuitry by different amounts in response to a given analogue level of the first signal.

18. The electronic device according to claim 1, wherein the clock propagating circuitry comprises a plurality of clock propagating components coupled at different points of the clock path; and
wherein the analogue circuitry comprises a plurality of analogue components, each analogue component configured to control the switching delay of a corresponding clock propagating component in dependence on the analogue level of the first signal.

19. The electronic device according to claim 1, wherein the electronic device comprises an integrated circuit.

20. The electronic device according to claim 1, wherein the electronic device comprises an agent device, control device, or sensor in a wireless sensor network or the Internet of Things.

21. An electronic device comprising:
means for generating a clock signal comprising a ring oscillator;
means for propagating a clock signal;
means for receiving an upstream clock signal from an upstream portion of the means for propagating and for outputting a downstream clock signal to a downstream portion of the means for propagating; and
means, coupled to the means for propagating, for varying, in dependence on an analogue level of a first signal received by the means for varying, a switching delay for the means for receiving to trigger a transition of the downstream clock signal in response to a transition of the upstream clock signal to reduce a frequency of the clock signal, wherein:
the first signal is a digitally-sampled voltage change signal indicative of a change in a supply voltage for the electronic device,
the means for varying is configured to vary the switching delay in dependence on the analogue level of the digitally-sampled voltage change signal,
the means for propagating is part of the means for generating, and
the means for varying is coupled to a node within a loop of the ring oscillator of the means for generating.

22. A method for an electronic device, comprising:
generating a clock signal using a ring oscillator;
receiving an upstream clock signal from an upstream portion of a clock path;
in response to the upstream clock signal, clock propagating circuitry outputting a downstream clock signal to a downstream portion of the clock path; and
using analogue circuitry coupled to the clock path, varying, in dependence on an analogue level of a first signal, a switching delay for the clock propagating circuitry to trigger a transition of the downstream clock signal in response to a transition of the upstream clock signal to reduce a frequency of the clock signal, wherein:
the first signal is a digitally-sampled signal indicative of a change in a supply voltage for the electronic device,
the analogue circuitry is configured to vary the switching delay in dependence on the analogue level of the digitally-sampled voltage change signal,
the clock propagating circuitry is part of the ring oscillator, and
the analogue circuitry is coupled to a node within a loop of the ring oscillator.

23. A non-transitory computer readable storage medium storing a standard cell library comprising data defining a plurality of standard cells for inclusion in an integrated circuit layout, at least one of the standard cells comprising:
a ring oscillator to generate a clock signal;
a clock path configured to propagate the clock signal;
clock propagating circuitry configured to receive an upstream clock signal from an upstream portion of the clock path and to output a downstream clock signal to a downstream portion of the clock path; and
analogue circuitry coupled to the clock path and configured to vary, in dependence on an analogue level of a first signal received by the analogue circuitry, a switching delay for the clock propagating circuitry to trigger a transition of the downstream clock signal in response to a transition of the upstream clock signal to reduce a frequency of the clock signal, wherein:
the first signal is a digitally-sampled signal indicative of a change in a supply voltage for the electronic device, the analogue circuitry is configured to vary the switching delay in dependence on the analogue level of the digitally-sampled voltage change signal, the clock propagating circuitry is part of the ring oscillator, and the analogue circuitry is coupled to a node within a loop of the ring oscillator.

* * * * *